United States Patent
Chen et al.

(10) Patent No.: US 8,794,644 B2
(45) Date of Patent: Aug. 5, 2014

(54) ROLLABLE LOG CART

(71) Applicants: Limin Chen, Dix Hills, NY (US); Daniel Charles Massaro, Lindenhurst, NY (US)

(72) Inventors: Limin Chen, Dix Hills, NY (US); Daniel Charles Massaro, Lindenhurst, NY (US)

(73) Assignees: Limin Chen, Dix Hills, NY (US); Daniel Charles Massaro, Lindenhurst, NY (US)

( * ) Notice: Subject to any disclaimer, the term of this patent is extended or adjusted under 35 U.S.C. 154(b) by 24 days.

(21) Appl. No.: 13/686,060

(22) Filed: Nov. 27, 2012

(65) Prior Publication Data

US 2014/0145407 A1    May 29, 2014

(51) Int. Cl.
*B62B 1/08* (2006.01)
*B62B 5/00* (2006.01)

(52) U.S. Cl.
CPC .................................... *B62B 5/0003* (2013.01)
USPC .................. 280/47.12; 280/47.18; 280/47.19; 280/47.33

(58) Field of Classification Search
CPC .............. B62B 1/00; B62B 9/08; B62B 5/067
USPC .......... 280/79.6, 79.7, 47.2, 47.24, 47.12, 40, 280/35, 645, 47.18, 47.19, 47.33
See application file for complete search history.

(56) References Cited

U.S. PATENT DOCUMENTS

| | | | | |
|---|---|---|---|---|
| 1,274,152 A | * | 7/1918 | Ells ............................. | 280/47.12 |
| 1,866,887 A | * | 7/1932 | Gleason et al. ............. | 280/47.12 |
| D146,784 S | * | 5/1947 | Best .............................. | D34/17 |
| 2,430,786 A | * | 11/1947 | Schlabach et al. ............ | 414/434 |
| 2,439,581 A | * | 4/1948 | Robins ........................... | 280/35 |
| 3,438,645 A | * | 4/1969 | Pounders ..................... | 280/645 |
| 4,335,990 A | * | 6/1982 | Apter et al. ................ | 280/47.12 |
| 5,116,068 A | * | 5/1992 | Declouette ................ | 280/47.24 |
| 6,086,310 A | * | 7/2000 | Lujan et al. ................. | 280/47.2 |
| 7,389,996 B2 | * | 6/2008 | Dube et al. ..................... | 280/35 |

* cited by examiner

*Primary Examiner* — Hau Phan
(74) *Attorney, Agent, or Firm* — Limin Wen

(57) ABSTRACT

A side-rollable log cart is invented to load and unload huge logs and remove such logs from a confined location. It also disclosed a method to load a large and heavy log onto the cart by laying down one side of the log cart and dragging such log with standard peavey tool by two men.

5 Claims, 7 Drawing Sheets

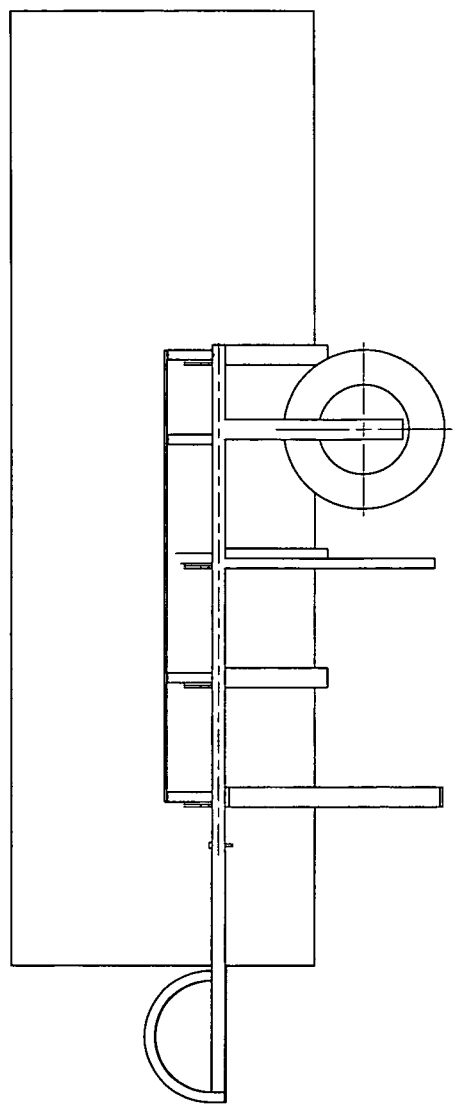
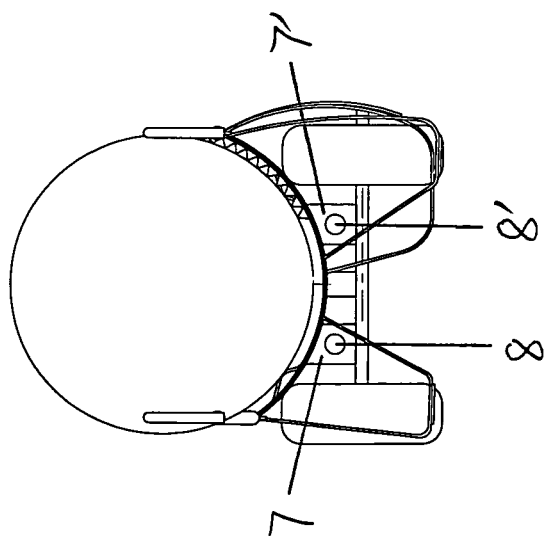
FIG. 4
FIG. 3

ROLLABLE LOG CART

FIELD OF THE INVENTION

This invention relates generally to a log cart. More specifically, the invention relates to a side-rollable log cart to transport logs with great weight and diameter from the site at which the logs were cut, especially in confined areas in woods, residential lawns, or the like where a large tree has been cut down and cut into logs.

BACKGROUND OF THE INVENTION

It was customary to have an arborist or tree surgeon to cut down large trees that were located in close proximity to structure, fence and the like, as not to allow a loader truck near enough to remove the debris. The usually large and often awkward logs and limbs would have to be transferred manually by up to or in excess of five (5) persons, by lifting and maneuvering the peculiar logs or limbs onto a standard dolly or hand cart or transferring by hand from a close quartered location to where the debris could be loaded onto a truck for disposal. Most often the logs and limbs would have to be removed over rough terrain such as mud, sand and the like as well as steep inclines or carefully maintained lawns or decks.

In the prior art, it has been proposed to provide wagons or carts of this type, to be utilized especially in transporting logs. The removal of logs from the site at which a tree has been cut has, in this situation, been a continuing problem, because of the cramped quarters, rough terrain, or other factors militating against ready loading and transportation of logs, particularly those of great in diameter and weight. For example, it is often necessary to cut down a large tree, the diameter of which may be perhaps two feet or more. The common practice is to cut the fallen trunk, and the branches thereof, into relatively short lengths, to facilitate removal from the site, and ultimate transport them to a selected destination. The means whereby the logs, after they have been cut into short lengths, are removed from the site are haphazard at best. In some instances, the logs are bodily lifted by the workers and carried. In other instances they may be dragged on skids, or with chains, or rolled along the ground if possible. These expedients, of course, leave much to be desired. Carts have been devised, in this connection, whereby large trunks are suspended from overhead yokes, to be pulled to another location. Such arrangements, however, are not satisfactory; since they still require chaining of the logs, and often result in the logs have one end dragging along the ground, thereby making the task of removal difficult. In other instance, carts designed to be elevated or lowered to facilitate loading or unloading have includes relatively complicated linkages, which may be quite satisfactory when the device is being used in a warehouse, or other location having a relatively level floor surface and loads taking the form of crates or other regularly shaped objects. However, carts of this type are not, in general, operable with desired efficiency. It is, accordingly, the main object of the present invention to provide a cart or a wagon that is especially adapted for use in confined terrain, for transporting logs of large diameters, while yet being dragged and capable of manufacture at a low cost.

In its most general sense, the present invention relates to a cart or a wagon that can be pulled by hand, and that is provided with a receptacle which can be lowered into engagement with the ground to facilitate loading and unloading.

In a more particular sense, the invention has reference to a log cart or wagon, particularly designed for transporting logs of great diameter and weight, that ordinarily resist easy handling, especially in confined areas in woods, residential lawns, or the like where a large tree has been cut down and cut into logs of perhaps two or three feet in length.

The invention has great utility, especially when used by tree cutters engaged in one or two-man operations, cutting trees in residential areas and the like for individual homeowners. It is often impossible, in these circumstances, to bring a truck directly to the site, and as a result, the tree must be cut into small pieces, and carried across the homeowner's property. It is also true, in many instances, that the areas through which one can carry the cut sections of the tree, and the debris resulting from the tree cutting operation, may be very narrow or otherwise restricted. This cart can help remove logs and limbs of a downed problematic tree from a confined area.

SUMMARY OF THE INVENTION

The present invention provides a log cart which is capable of carrying heavy logs and/or limbs comfortably by one person once loaded from a confined location, through standard fence gates, to an area of which the logs or limbs can be loaded onto a loader truck to be disposed of.

The unique feature of this log cart is side-rollable. In other words, loading a large log onto the cart needs to lay down one side of the cart and roll the large log into the cradle of the cart with standard peavey tools by two men. The cart can be placed on its rolling side next to a large log (up to 30 inches in diameter). There are multiple curved side-rolling rims for side rolling purpose. The cart has one set of heavy duty pneumatic wheels for moving the cart. Additionally, the cart has multiple curved chassis with built-in grabbing teeth to secure the log during loading process. The cart is also equipped with a set of ratchet strap for securing the log on the cart, a set of removable handles for moving the cart, and a set of synthetic Nylon pads for protecting the paved surfaces when the cart is standing with the loaded heavy log.

BRIEF DESCRIPTION OF THE DRAWINGS

FIG. 3 is a front view of a side-rollable log cart with a loaded large log.

FIG. 4 is a side view of a side-rollable log cart with a loaded large log.

DETAILED DESCRIPTION OF THE PREFERRED EMBODIMENTS

Figure 1:
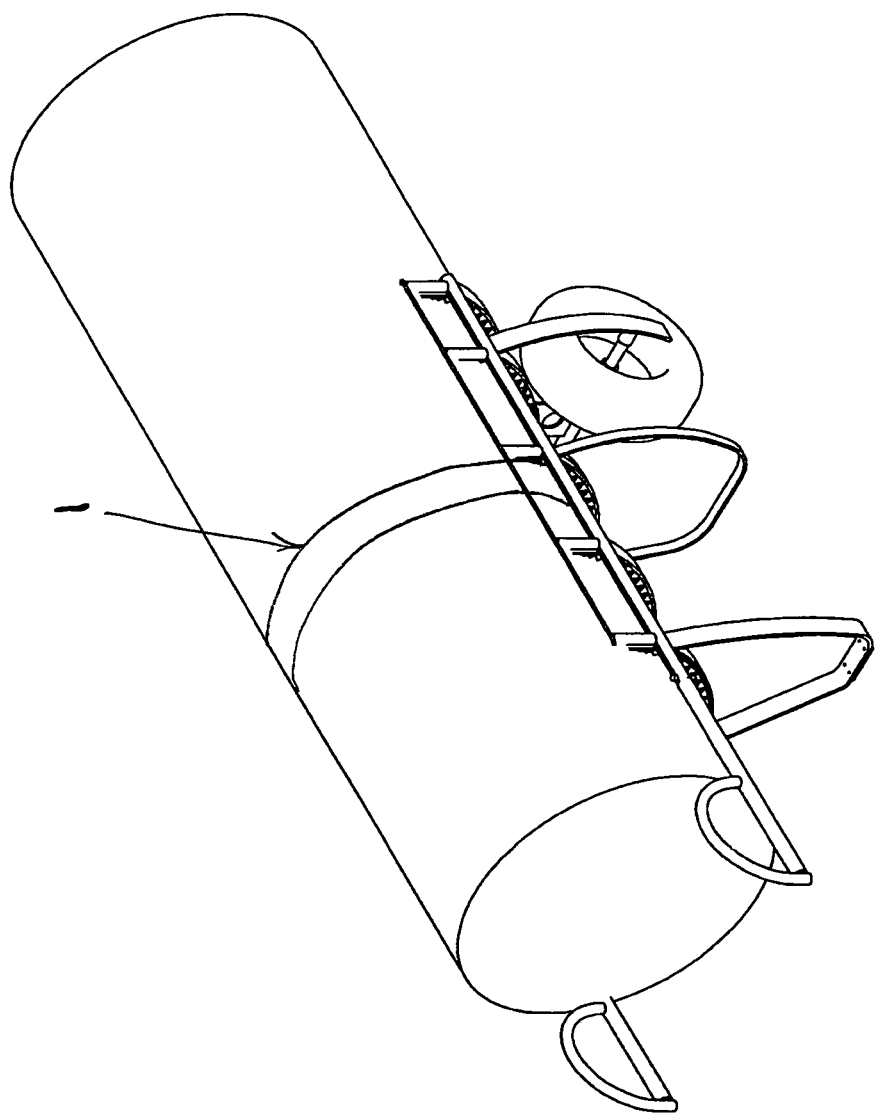
FIG. 1 is a perspective view of a side-rollable log cart with a loaded large log.

Disclosed is a cart or wagon specially designed for removing logs—particularly those of great weight and diameter—from the site at which the logs were cut, to a truck or other vehicle used for transporting the logs to a remote destination (see FIG. 1).

Figure 2:
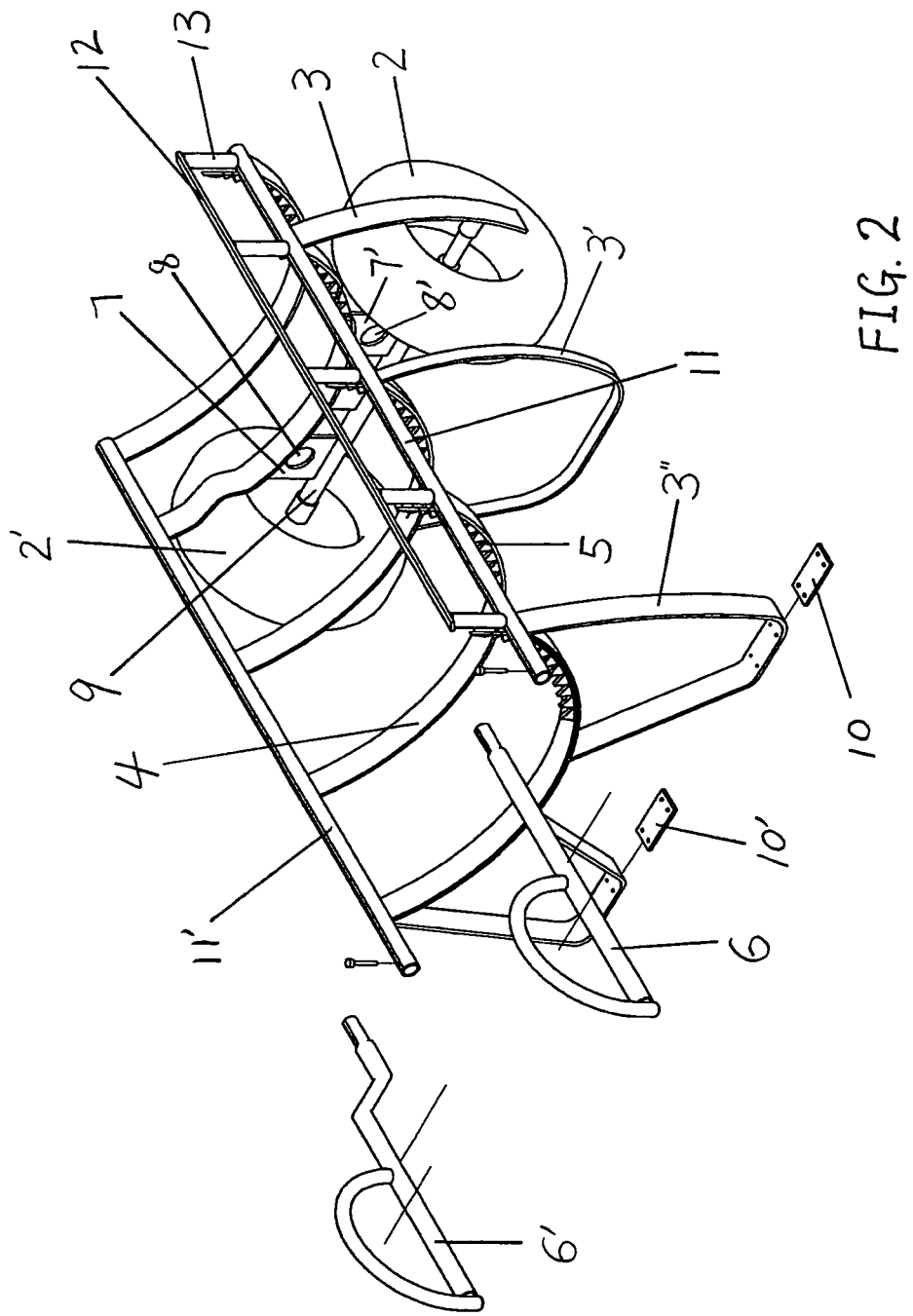
FIG. 2 is a perspective view of a side-rollable log cart without a loaded large log.

The log cart is side-rollable, wherein the cart can be placed on its one side next to a large log (up to 30 inches in diameter)

which will be loaded onto the cart. Also, the cart is equipped with a set of ratchet strap (1) for securing the log on the cart (see FIG. 1). In FIG. 2, the cart has one set of heavy duty pneumatic wheels (2, 2') for moving the cart, multiple curved side rolling rims (3, 3', 3") for side rolling and for protecting the pneumatic tire during rolling action, multiple curved chassis rims (4) with partially built-in grabbing teeth (5) on the rolling side as the base of a cradle or receptacle, and a set of removable handles (6, 6') for dragging the cart (the two handles are inserted and fixed into the side bars of the cart by two standard screws). Additionally, the cart has two supporting plates (7, 7') fixed between the curved chassis rim (4) and the axle (9) on which wheels revolve, wherein there are two peavey storing holes (8, 8') in the supporting plates (7, 7') for storing two separate peaveys when they are not in use (one hole in each supporting plate), and a set of synthetic Nylon pads (10, 10') at the bottom of the supporting legs in front of the cart to protect the paved surfaces where the cart is standing on with the loaded heavy log. Moreover, there are two side bars (11, 11') fixed at the ends of the multiple curved chassis rims (4) and located on both sides of the log cart. There is a leading edge bar (12) supported by multiple supporting columns (13) between the leading edge bar (12) and the side bar (11) in the rolling side as log entrance. The cart has a width under 35 inches so it can go through a standard 36 inches fence gate. In use of the device, let it assume that a tree has been fallen and has been cut into logs, in these circumstances, the cart is moved adjacent the log. Using two standard peaveys, two men can easily roll a large log up to 30 inches in diameter and weights up to 1,776 lbs. into the cart through the rollable side of the cart.

FIG. 3 shows a front view of a side-rollable log cart with a loaded large log. The supporting plates (7, 7') and the peavey storing holes (8, 8') can be viewed more clearly in this FIG. 3.

FIG. 4 shows a side view of a side-rollable log cart with a loaded large log. There is a 30 inches in diameter and 96 inches in length tree log loaded on this side-rollable cart.

Figure 5:
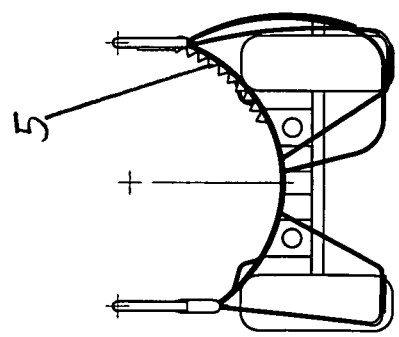
FIG. 5 is a front view of a side-rollable log cart without a loaded large log.

FIG. 5 shows a front view of a side-rollable log cart without a loaded large log. The built-in partial grabbing teeth (5) can be viewed more clearly without loaded log in this FIG. 5. The total width of the cart shown in this figure is 34.36 inches and the total height of the cart shown in this figure is 29.24 inches.

Figure 6:
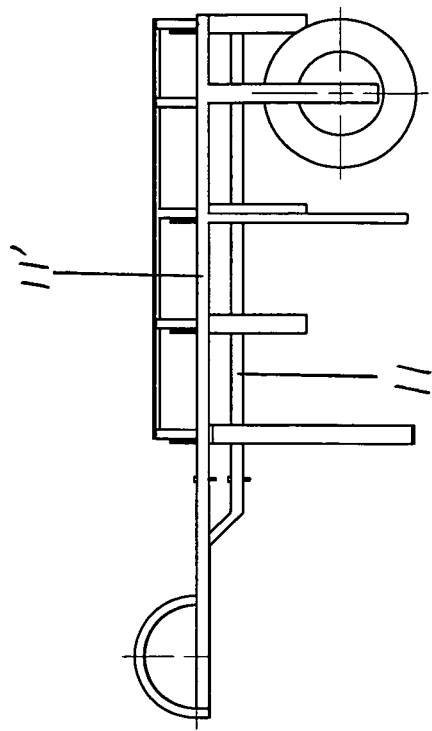
FIG. 6 is a side view of a side-rollable log cart without a loaded large log.

FIG. 6 shows a side view of a side-rollable log cart without a loaded large log. The half-moon shaped removable handle and how the screws fix the handles into the side bars (11, 11') of the cart can be viewed clearly. The total length (including handles) of the cart shown in this figure is 76.25 inches.

Figure 7:
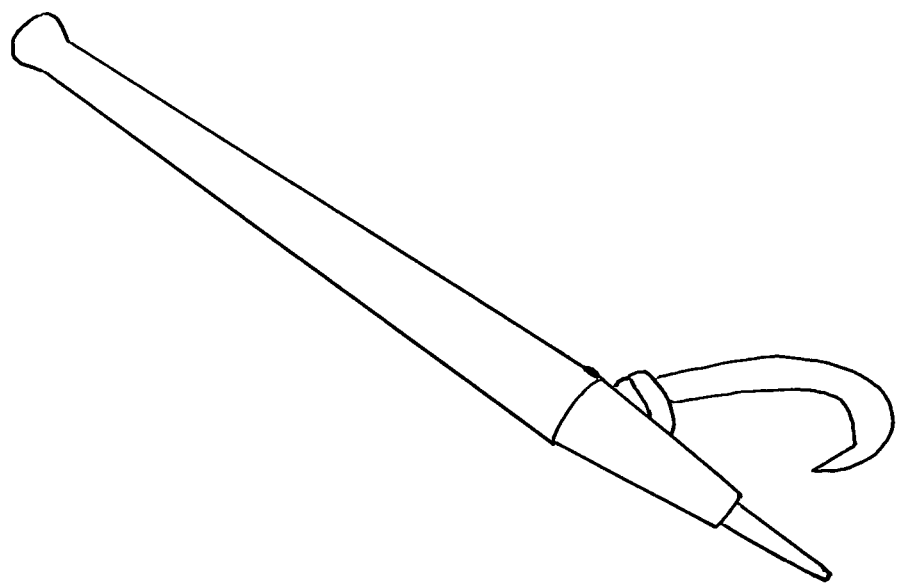
FIG. 7 is a perspective view of a standard peavey.

FIG. 7 shows a perspective view of a standard peavey which includes spear tip (which can be inserted into a log or into the peavey storing holes), hook (which is used to hold the log), and wooden handle. The total length of the peavey is about 60 inches.

Figure 8:
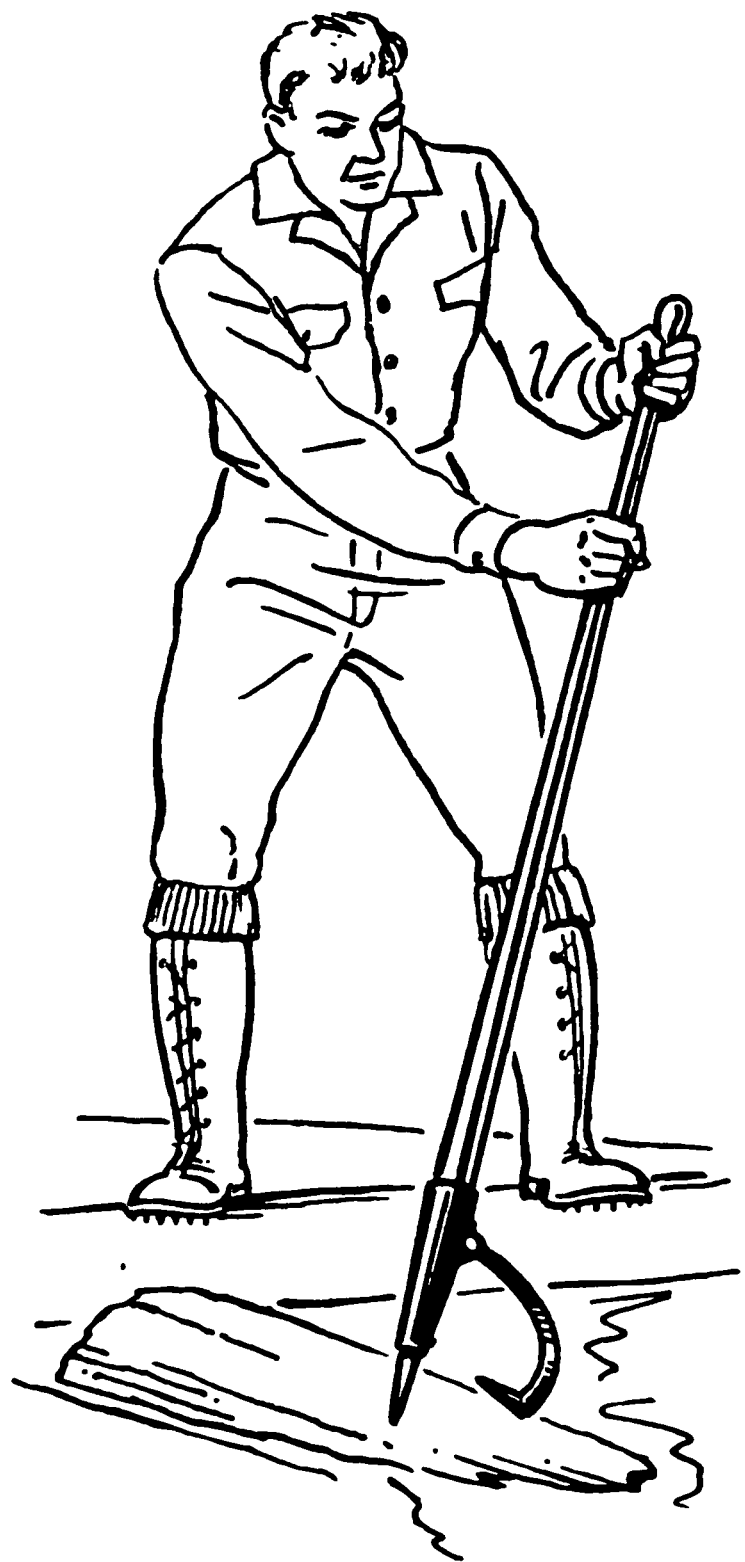
FIG. 8 is a perspective view of a man is using a standard peavey tool to grab a log.

FIG. 8 shows a perspective view of a man is using a standard peavey tool to grab a log. In this invention, it is possible to load a log on the side-rollable cart by one person using a peavey. Also, it would be much easier to load a log by two person using two peaveys at the same time.

Figure 9:
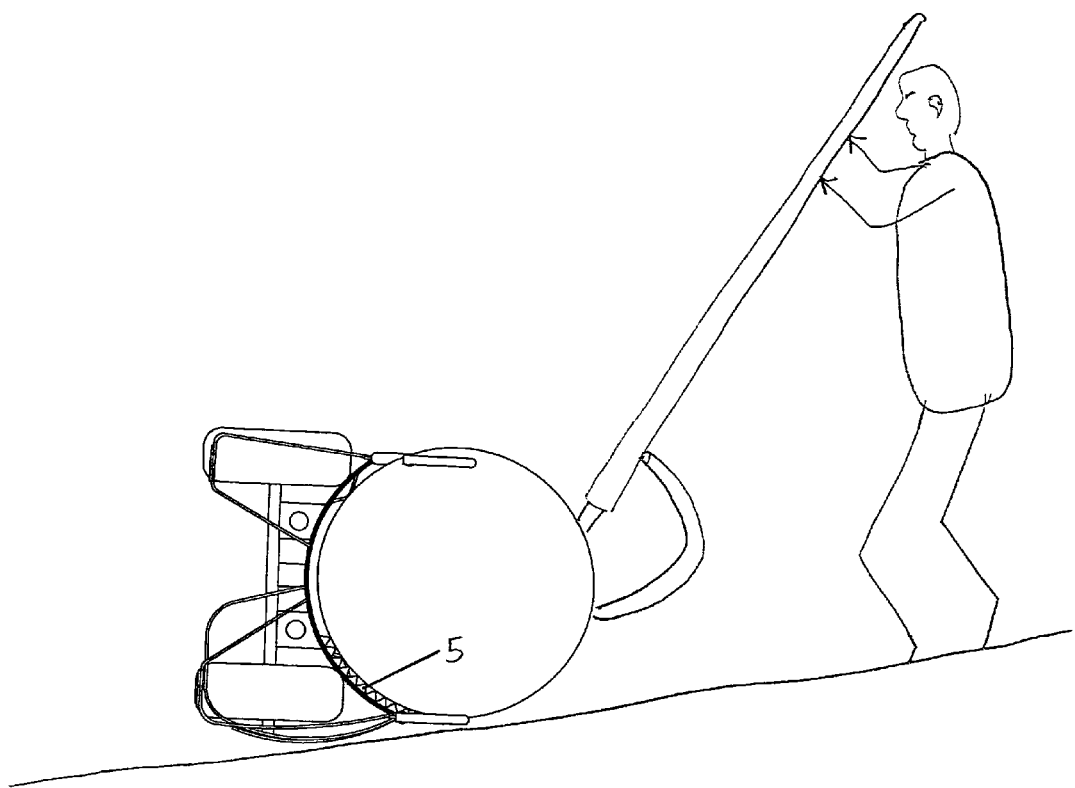
FIG. 9 is a side view of a man using a standard peavey tool to load a log onto a side-rollable log cart.

FIG. 9 shows a side view of a man using a standard peavey tool to load a log onto a side-rollable log cart. In this figure, the cart has been laid down on its rollable side and the log has been grabbed by built-in grabbing teeth (5) and a peavey handled by a person.

The log cart as illustrated, under conditions such as those described above, is highly effective in permitting removal of the entire tree from the site at which the tree is cut down, to a nearby truck or loading area. The cart needs not even be turned around, when it has been loaded and make ready to be pulled away.

Such side-rollable log cart has the following advantages:
1. Strong enough to carry heavy logs and small enough to pass through standard fence gate;
2. Unique side rolling feature without using any complicated mechanical or electric power to load a large log up to 30 inches;
3. Two men can easily finish the loading and one man can drive the cart which is perfect for a small tree-cutting team;
4. Great design for confined area and inexpensive to manufacture;
5. Multiple curved side-rolling rims designed on one side of the cart for side rolling purpose and to protect the pneumatic tire underneath;
6. The cart has a set of removable handles for moving the cart and for easy transportation or storage of the cart;
7. The cart has multiple curved chassis with partially built-in grabbing teeth on the rolling side;
8. The cart has a set of synthetic Nylon pads for protecting the paved surfaces;
9. The cart has one set of heavy duty pneumatic wheels for moving the cart;
10. The cart is equipped with a set of ratchet strap for securing the log on the cart;
11. The cart has two holes in the supporting plates underneath the chassis for storing two standard peaveys;
12. The cart can be equipped with a drum cart or plate at the opposite side of the removable handles of the cart (as an accessory) and used as a carrier for other purpose except a log cart.

In summary, the present invention provides a novel, portable, strong, and relatively small log cart, which is inexpensive and easy to manufacture. Such side-rollable log cart is very attractive to a small tree-cutting team and an option to be carriers in many manufacture plants or a yard carrying tool without occupying much space in a garage or outside garage.

While particular embodiments of this invention have been shown in the drawings and described above, it will be apparent, that many changes may be made in the form, arrangement and positioning of the various elements of the combination. In consideration thereof it should be understood that preferred embodiments of this invention is only for illustration purpose and not intended to limit the scope of the invention. Although the side-rollable log cart and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What is claimed is:

1. A side-rollable log cart comprising:
(a) two heavy duty pneumatic wheels linked by an axle for moving said cart;
(b) multiple curved chassis rims mounted to two side bars of said cart as the base of a cradle or a receptacle of said cart, wherein there are partially built-in toward up grabbing teeth mounted on each of said multiple curved chassis rims near one side of said cart as a rolling side;
wherein the two side bars fixed at each end of the multiple curved chassis rims and located on both sides of said cart;

(c) two removable handles inserted and fixed into one end of said side bars of said cart by two standard screws;

(d) three supporting legs mounted under said side bars and said multiple cured chassis rims, wherein first supporting leg located near one said removable handle and on one side of said cart, wherein second supporting leg located near another said removable handle and on said rolling side of said cart, wherein third supporting leg located between second supporting leg and one of said heavy duty pneumatic wheels on said rolling side of said cart;

(e) three curved side rolling rims, wherein one mounted between said side bar on said rolling side and one end of said axle for protecting said pneumatic wheels during rolling process and wherein the other two mounted between said bars and said second and third supporting legs and formed as part of said second and third supporting legs for side rolling purpose;

(f) two supporting plates fixed between said curved chassis rim and said axle, wherein there is a peavey storing hole on each of said supporting plate for storing two separate peaveys;

(g) a leading edge bar supported by multiple supporting columns between said leading edge bar and said side bar on one side of said cart as a rolling side for a log entrance;

(h) two synthetic Nylon pads at the bottoms of two supporting legs in front of said cart;

(i) a set of ratchet strap installed in the middle of said cart for securing a log on said cart.

2. The width of said side-rollable log cart in claim 1 is less than 35 inches which is narrower than a standard 36 inches fence gate.

3. The frame of said side-rollable log cart in claim 1 is made from metal.

4. A method of using said side-rollable log cart in claim 1 comprising:
(a) move said side-rollable log cart to a log and put down said rolling side of said cart along with said log;
(b) use two standard peaveys to drag said log onto said cart by two persons afterword said cart is placed back to its standing position due to the weight of said log;
(c) tight said ratchet strap to secure loaded said log on said cart;
(d) pull away said cart loaded with said log by holding said two removable handles.

5. A method of storing two standard peaveys into said side-rollable log cart in claim 1 comprising:
(a) put said cart up on its back part where said two heavy duty pneumatic wheels located;
(b) insert first standard peavey into one of said peavey storing holes on one of said supporting plates;
(c) insert second standard peavey into the other of said peavey storing holes on the other of said supporting plates.

* * * * *